United States Patent
Goldman

[11] Patent Number: 6,016,322
[45] Date of Patent: Jan. 18, 2000

[54] APPARATUS AND METHOD FOR SELF SYNCHRONIZATION IN A DIGITAL DATA WIRELESS COMMUNICATION SYSTEM

[75] Inventor: Herbert B. Goldman, Tustin, Calif.

[73] Assignee: Kor Electronics, Inc., Garden Grove, Calif.

[21] Appl. No.: 08/934,800

[22] Filed: Sep. 22, 1997

[51] Int. Cl.[7] .............................. H04B 7/212; H04J 3/00; H04J 3/06
[52] U.S. Cl. ............................................ 370/508; 370/337
[58] Field of Search ..................................... 370/252, 328, 370/336, 337, 347, 375, 350, 356, 503, 508, 519; 455/456, 450

[56] References Cited

U.S. PATENT DOCUMENTS

| | | | |
|---|---|---|---|
| 4,292,683 | 9/1981 | Jueneman | 370/324 |
| 5,119,504 | 6/1992 | Durboraw, III | 455/54.1 |
| 5,177,740 | 1/1993 | Toy et al. | 370/100.1 |
| 5,389,934 | 2/1995 | Kass | 342/357 |
| 5,519,710 | 5/1996 | Otsuka | 370/95.3 |
| 5,537,685 | 7/1996 | Matsuno | 455/51.1 |
| 5,546,445 | 8/1996 | Dennison et al. | 379/60 |
| 5,550,992 | 8/1996 | Hashimoto | 375/355 |
| 5,559,520 | 9/1996 | Barzegar et al. | 342/357 |
| 5,640,396 | 6/1997 | Cudak et al. | 370/337 |
| 5,642,355 | 6/1997 | Smith | 370/337 |

*Primary Examiner*—Michael Horabik
*Assistant Examiner*—Kevin C. Harper
*Attorney, Agent, or Firm*—Pennie & Edmonds LLP

[57] ABSTRACT

The present invention pertains to a self-synchronization apparatus and method for use in a multiple access channel communication network. In an embodiment of the present invention, the communication system is a wireless mobile telephone network having a service area including one or more base stations and multiple mobile stations. The base and mobile stations are in communication with a Global Positioning System (GPS). A mobile station communicates with a particular base station through a TDMA radio communication link. Each mobile station is assigned one time slot for transmitting data to the base station and a second time slot for receiving data from the base station. The mobile station and the base station exchange their respective GPS positions. A transmitting station determines a time delay based on the receiving station's GPS position. This time delay is used to advance a transmission to the receiving station so that it is received at the receiving station at a time that coincides with the start of the time slot.

19 Claims, 8 Drawing Sheets

APPARATUS AND METHOD FOR SELF SYNCHRONIZATION IN A DIGITAL DATA WIRELESS COMMUNICATION SYSTEM

BRIEF DESCRIPTION OF THE INVENTION

The present invention relates generally to wireless communication. More particularly, the invention relates to synchronization for a time division multiple access (TDMA) wireless communication system.

BACKGROUND OF THE INVENTION

In a typical digital wireless radio telephone system, multiple mobile stations (or subscribers) and a respective base station communicate across TDMA channels. Data is transmitted in frames, each of which comprises a number of time slots. The multiple mobile stations share the same transmission and reception frequencies, but are assigned separate time slots within those frequencies. In normal operation, the mobile stations transmit bursts of data at certain times allowing for propagation delays so that the bursts are received at the base station in their assigned time slot. Otherwise, transmissions from different mobile stations would collide or overlap, resulting in mutual interferences in the reception at the base station. Typically, a guard time is inserted in the time slots to help prevent the bursts from colliding. Such collisions occur if the time slots are exposed to variations in the propagation delay between a mobile station and the base station.

FIG. 1 illustrates a TDMA frame structure based on the IS-54 transmission standard. Each frame 100 has a duration of 40 msec and includes six time slots 102, each having a duration of 6.67 msec. Each frame 100 is comprised of 1944 bits, or 972 symbols, where each symbol is comprised of two bits. Each time slot 102 contains a 28-bit sequence as a preamble 104 which is used for synchronization. The remainder of the time slot 106 contains digitized voice data (DATA) along with six bits necessary for a guard time (G) that is used to avoid burst collisions, a ramp time (R) for the transmitter in the mobile station, in-band signaling through a slow access control channel (SACCH), synchronization and training (SYNC), and digital verification color code (DVCC).

In order for a mobile station to transmit, the mobile station must identify and locate the beginning of an assigned time slot. The identification of the start of the time slot is referred to as synchronization. The propagation delay incurred in transmitting data between two communicating stations effects the identification of the mobile station's time slot. The propagation delay varies as the distance between a mobile station and the base station varies.

In some systems, the guard time is selected to be small for spectral efficiency. A time advance is used to compensate for the propagation delay. The time advance indicates the time at which the mobile station advances transmission of the message in order for a receiving station to receive a burst at the designated time slot. Initially, the time advance is determined by the base station and provided to the mobile station through signaling. The time advance is based on a coarse approximation of the distance between the mobile unit and the base station. This approximation is then refined during subsequent transmissions. The base station calculates a time offset that is used to adjust the time advance. The base station determines the time offset from the time that it transmits and receives bursts to and from the transmitting station. Each newly calculated time offset is then provided to the transmitting station on the SACCH.

This type of system suffers from the additional overhead used to determine the time advance and the time offset and to communicate these values between the two communicating stations. This is attributable to the coarse measurement that is used for determining the distance between the two communicating stations. This distance effects the propagating delay thereby requiring the time offset to be continuously updated and transmitted to the transmitting station. Accordingly, there exists a need for a synchronization mechanism that can overcome this shortcoming.

SUMMARY OF THE INVENTION

The present invention pertains to a self-synchronization apparatus and method for use in a multiple access channel communication network. In an embodiment of the present invention, the communication system is a wireless mobile telephone network having a service area including one or more base stations and multiple mobile stations or subscribers. The base and mobile stations are in communication with a Global Positioning System (GPS) and receive GPS data including latitude, longitude, elevation, and time.

A mobile station communicates with a particular base station through a control channel communication link. Each mobile station is assigned one time slot for transmitting data to the base station and a second time slot for receiving data from the base station. The mobile station and the base station exchange their respective GPS positions. A transmitting station determines a time delay based on the receiving station's GPS position. This time delay is used to advance a transmission to the receiving station so that it is received at the receiving station at a time that coincides with the start of the time slot.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
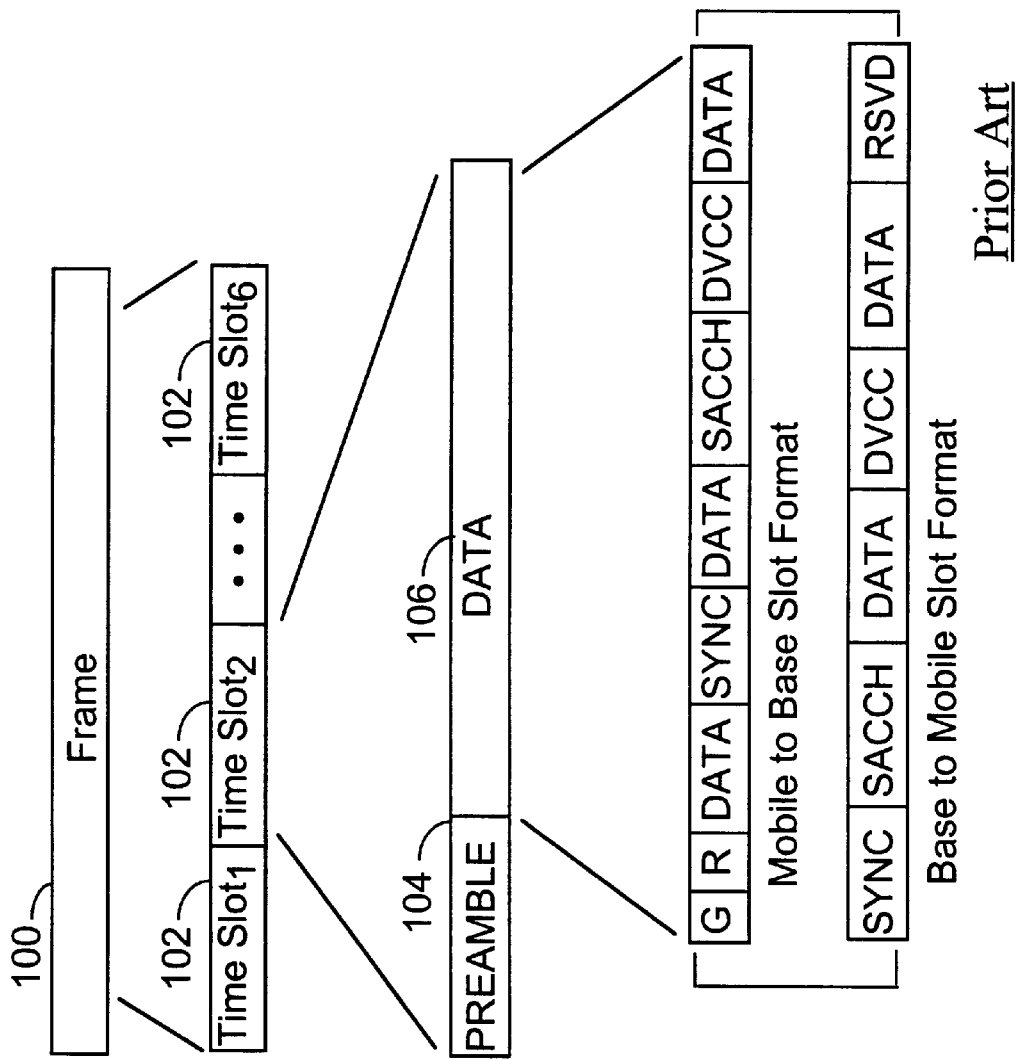
FIG. 1 illustrates a prior art TDMA time slot structure.
Figure 2:
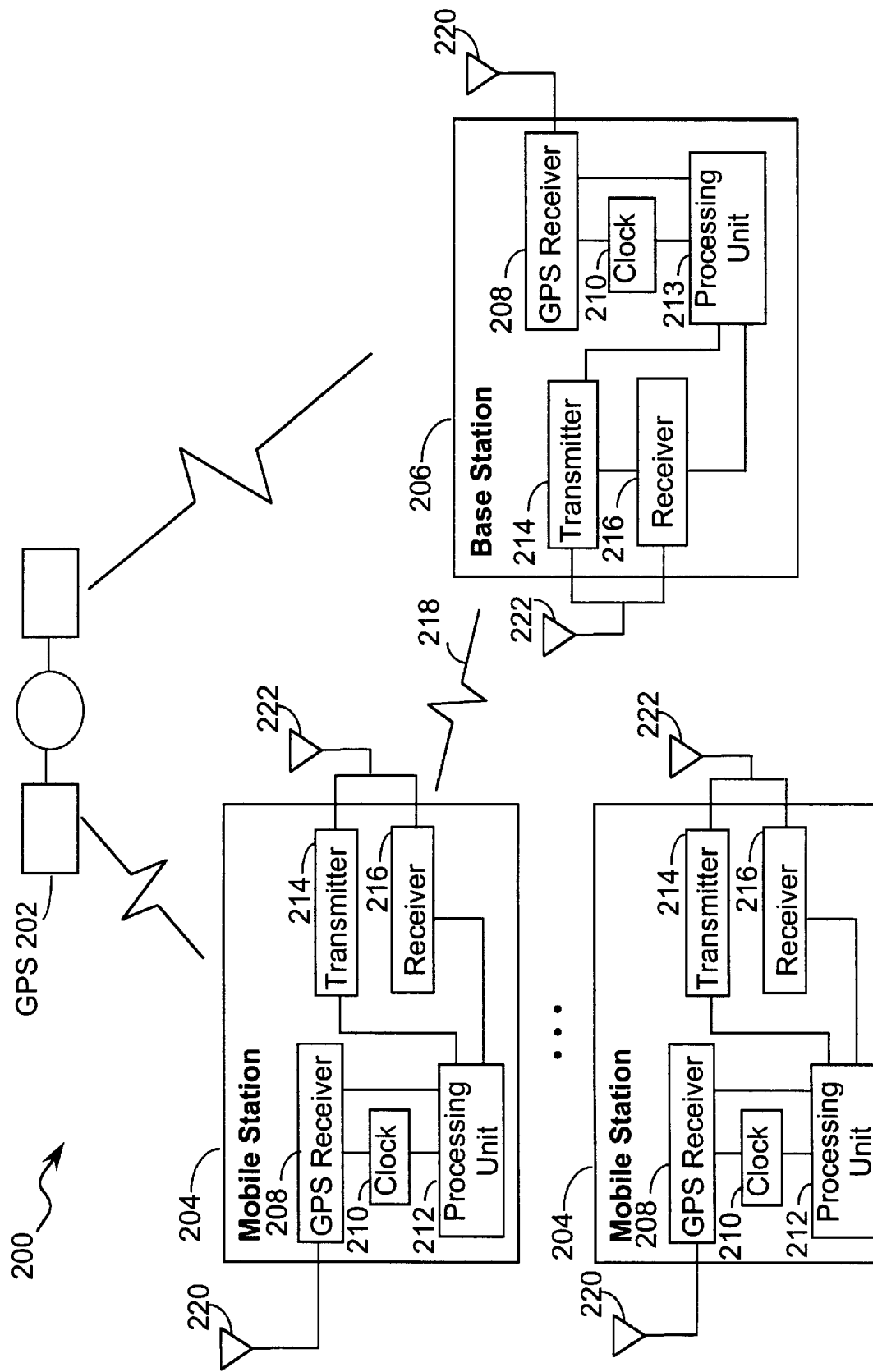
FIG. 2 illustrates a communication system in accordance with an embodiment of the present invention.

FIG. 2 illustrates the communication system 200 of the present invention. In one embodiment, the communication system 200 is a wireless mobile telephone network that has a service area divided into a number of cells or radio zones. There is at least one base station 206 located in each radio zone. The base station 206 may be connected to a control station (not shown) through a wired and/or radio link. At least one mobile station 204 is active in the service area and may move from one radio zone to another.

The communication system 200 includes a Global Positioning System (GPS) 202, one or more mobile stations 204, and one or more base stations 206. For illustration purposes only, the communication system 200 in FIG. 2 is depicted as having one base station 206. However, the present invention is not constrained to any particular number of mobile 204 or base 206 stations.

The GPS or NAVSTAR global positioning system 202 is a system of satellites in orbit around the earth. The GPS 202 is used to determine the location of both the mobile 204 and base 206 stations.

The mobile units 204 are in direct contact with a base station 206 and transmit and receive messages over an air interface 218. In an embodiment of the present invention, the air interface 218 can be a predetermined spectrum of radio frequencies. The mobile units 204 and the base station 206 also receive signals from the GPS 202. The mobile units 204 can be vehicle-mounted, hand held, portable or wireless telephone units. The mobile unit 204 can include a user interface (such as a microphone, loudspeaker, display and keyboard for the management of speech calls), an interface to some other terminal equipment (such as an interface to a personal computer or facsimile machine), and the like (not shown).

Both the mobile 204 and base 206 stations include a GPS receiver 208, a GPS radio antenna 220, a clock 210, a processing unit 212, a transmitter 214, a receiver 216, and a second radio antenna 222.

The GPS receiver 208 includes a radio antenna 220 for communication with the GPS 202. The GPS receiver 208 receives information including transmitted coordinates and which is converted into GPS data representing latitude, longitude, elevation, and time. A more detailed explanation of the GPS receiver 208 can be found in U.S. Pat. No. 4,754,465, by Charles Trimble, issued Jun. 28, 1988, assigned to Trimble Navigation, Inc, which is hereby incorporated by reference.

The exact location of a mobile station 204 and a base station 206 is determined using the Global Positioning System (GPS) or NAVSTAR, LORAN, or other position determining system 202. It should be noted that the present invention is not limited to GPS 202 and can utilize any type of positioning system that can produce a measurement of a wireless unit's geographic position. GPS 202 is a system employing approximately eighteen satellites in twelve hour orbits of 55°. The system communicates with ground-based receivers 208 and based on the signals received from the satellites, the exact position in longitude and latitude of the ground-based receiver 208 can be determined with a high degree of accuracy and precision.

The GPS 202 is a passive navigation system on the part of the user, in that only reception of satellite-transmitted signals is required by the user to compute position. The GPS 202 provides a capability for continuous position determination, and a position can be computed on the order of every second of time, and thus provides a capability of determining the position of a highly mobile station. A fuller discussion of the GPS is presented in textbooks, such as "Handbook of Modern Electronics and Electrical Engineering," edited by Charles Belove and published in 1986 by Wiley-Interscience (see chapter 54 thereof, the disclosure of which is incorporated herein by reference as background information).

The radio antennas 222 are suitable for the radio frequencies that are licensed and allocated within the radio spectrum set aside for the service between a mobile station 204 and the base station 206. In a TDMA network, a forward channel or frequency is used for the base-to-mobile path and a reverse channel is used for the mobile-to-base path. The base-to-mobile path is often referred to as a down link radio signal and the mobile-to-base path as an up link signal. A down link signal is transmitted by a base station transmitter to a mobile station antenna and received by the mobile station receiver. An up link signal is transmitted by one of the mobile stations to a base station antenna and received by the base station receiver. Processing of the up link and down link signals by the transmitters and receivers is well known in the art and as such will not be discussed in great detail.

Figures 3A, 3B:
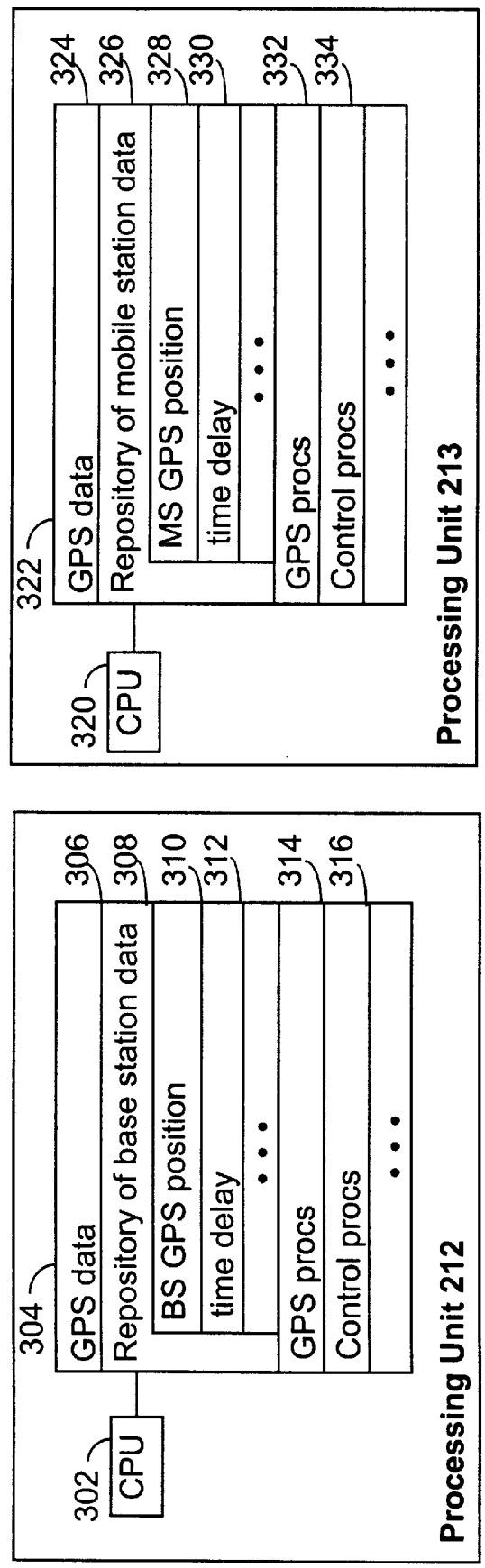
FIGS. 3A–3B illustrate the components of the processing units in the mobile and base stations shown in FIG. 2.

A processing unit 212, 213 is provided to control the operation of the mobile station 204 and the base station 206. The processing unit 212, 213 can be any type of computing device such as but not limited to a microprocessor, specialized ASCII module, and the like. Referring to FIG. 3A, the processing unit 212 for a mobile station 204 includes a central processing unit (CPU) 302 and a memory 304. The processing unit 212 has other resources which are not shown. The memory 304 may be implemented as RAM (random access memory) or a combination of RAM and non-volatile memory.

The memory 304 can include GPS data 306 including time, latitude, longitude, and elevation; a repository of base station data 308; GPS procedures 314 that are used to convert the GPS signals into GPS data 306; a control procedure 316 that is used to control the operation of the mobile station 204; as well as other data and procedures. The repository of base station data 308 includes data particular to a select base station 206 and can include a base station's (BS) GPS position 310 and a time delay 312 computed by the control procedure 316 for transmitting messages to a particular base station 206.

The processing unit 213 for a base station 206 includes a CPU 320 and a memory 322. The processing unit 213 has other resources which are not shown. The memory 322 may be implemented as RAM (random access memory) or a combination of RAM and non-volatile memory.

The memory 322 can include GPS data 324 including time, latitude, longitude, and elevation; a repository of mobile station data 326; GPS procedures 332 that are used to convert the GPS signals into GPS data 324; a control procedure 334 that is used to control the operation of the base station 206; as well as other data and procedures. The repository of mobile station data 326 includes data particular to a select mobile station 204 and can include a mobile station's (MS) GPS position 328 and a time delay 330 computed by the control procedure 334 or transmitting messages to the particular mobile station 204.

Referring to FIG. 2, a clock 210 is provided for maintaining the time of day. Both the clocks 210 in the mobile 204 and base 206 station are set to the GPS time obtained from the GPS 202. In this manner, both stations are synchronized to a common temporal reference point.

The foregoing has described the communication system of the present invention. Attention now turns to the manner in which the communication system operates.

The communication system 200 transmits data in TDMA channels. One channel or frequency is used to transmit data or messages from the mobile station 204 to the base station 206 and a second channel or frequency is used to transmit data from the base station 206 to a mobile station 204. A control channel is also used to transmit control data between the transmitting and receiving stations. The base station 206 will assign a time slot on the first channel for a particular mobile station to use in transmitting messages to the base station 206. The base station 206 will also assign a time slot on the second channel that the base station will use to transmit a message to the mobile station 204.

The propagation or time delay that is incurred in transmitting the message between two communicating stations is based on the distance between the two stations. The GPS position is used to determine the distance between the two stations and hence the time delay. The GPS position is an accurate measurement of the location of a station. By using the GPS position of the transmitting and receiving stations in determining the time delay, a more accurate measurement is made. The accuracy in the time delay affords each station the capability of self-synchronization. It eliminates the need for additional communications that were needed in the prior art to transmit a time advance and the time offsets that were used to constantly refine the time advance as the communication progresses.

Each station has a GPS receiver that enables a station to determine its GPS position. The communicating stations transmit to each other over a control channel their respective GPS position. A transmitting station uses the GPS position of the receiving station to determine the time delay for transmitting a message to a receiving station. The transmitting station transmits the message before the start of the time slot by the amount indicated in the time delay. In this manner, the message is received at the beginning of the time slot and can eliminate the need for the guard time.

Figure 4:
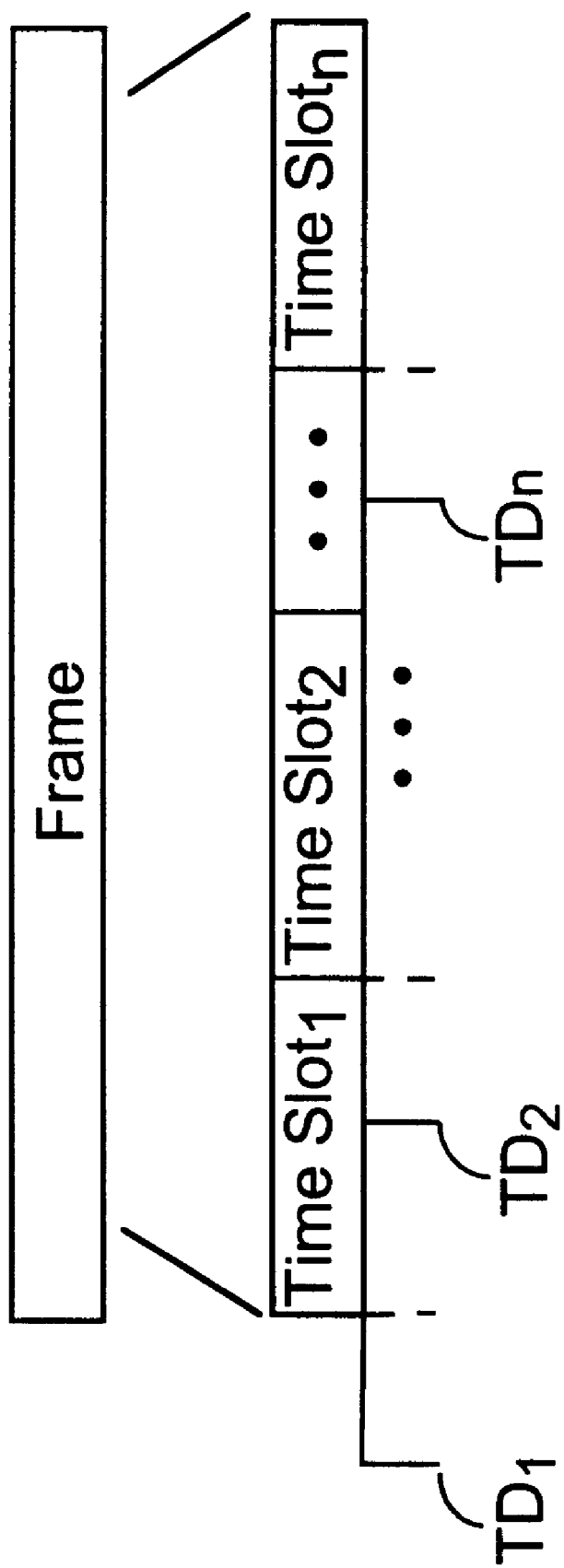
FIG. 4 illustrates the timing sequence that is used to transmit a message in an embodiment of the present invention.

Referring to FIG. 4, a mobile station 204 assigned time slot 1 will transmit a message to a receiving station before the start of the time slot at a time point represented as $TD_1$ which can be represented mathematically as |the start of the time slot 1–time $delay_1$|. Likewise, a mobile station 204 assigned to transmit at time slot 2 will transmit a message to a receiving station at a time point designated as $TD_2$ which can be represented mathematically as |the start of the time slot 2–time $delay_2$|.

Figure 5:
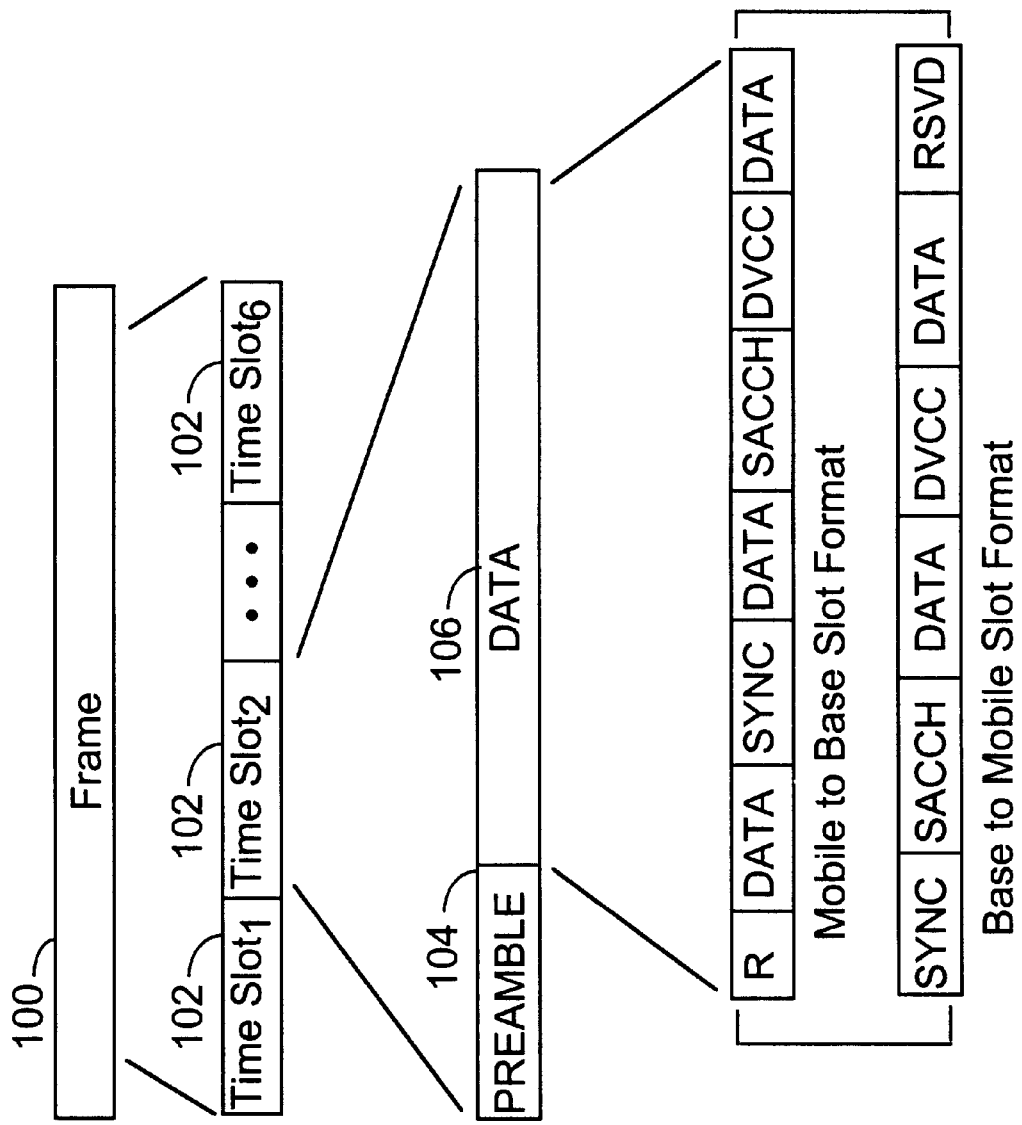
FIG. 5 illustrates an exemplary TDMA time slot structure in accordance with an embodiment of the present invention.

The present invention eliminates the need for the guard time. The guard time was used to prevent burst collisions in which the beginning of one station's data transmission overlaps with the end of another station's data transmission. This was needed in the prior art to compensate for the inaccuracy in the position measurement of the receiving station. FIG. 5 illustrates an exemplary TDMA time slot structure that can result from an embodiment of the present invention. In this TDMA time slot structure, the mobile to base slot format does not have a guard time. It should be noted that the present invention is not constrained to the transmission standard depicted in FIG. 5 and that this standard is used for illustration purposes only.

Figure 6:
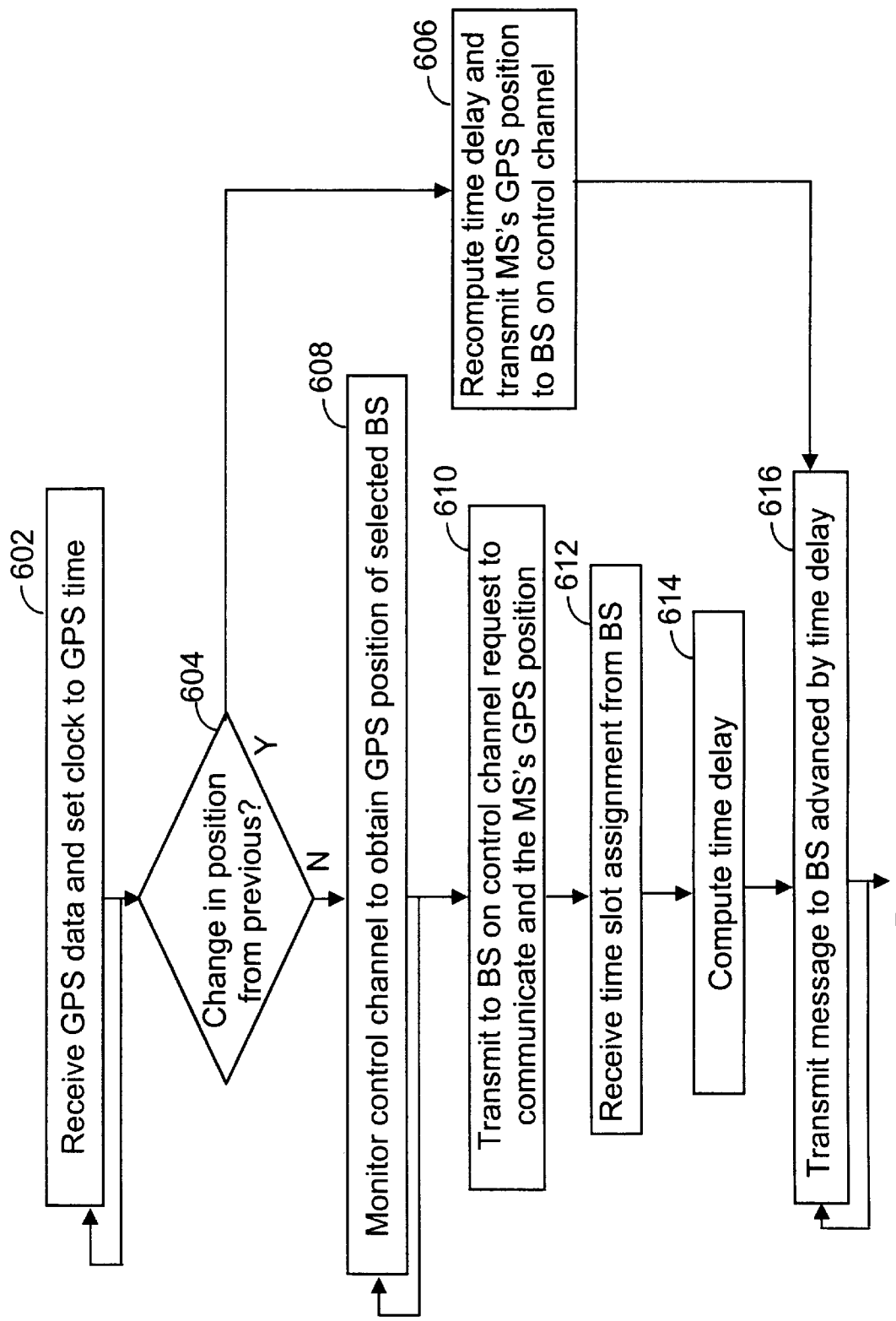
FIG. 6 illustrates the steps used by the mobile station to communicate with a base station.

FIG. 6 illustrates the steps used by the mobile station 204 in an embodiment of the claimed invention. When the mobile station 204 becomes operational, the GPS receiver 208 receives signals from the GPS 202 which are transmitted to the processing unit 212 (step 602). The GPS procedures 314 are used to convert the signals into GPS data 306 representing the latitude, longitude, and elevation of the mobile station's current position as well as the GPS time (step 602). The GPS procedures 314 set the clock 210 to the GPS time (step 602).

The GPS receiver 208 continuously receives at predefined time intervals signals from the GPS 202. The GPS procedures 314 convert these signals into GPS data 306 and determine whether the location of the mobile station 204 has significantly changed (step 604). When the GPS position varies beyond a designated threshold (step 604-Y), the control procedure 316 recomputes the time delay and transmits on the control access channel the new GPS position to the base station 206 (step 606).

Next, the control procedure 316 in the mobile station 204 monitors the control channel to obtain the GPS position of an intended base station 206 (step 608). The control procedure 316 stores the base station's (BS) GPS position 310 in the base station repository 308. The control procedure 316 in the mobile station 204 then initiates a request to the intended base station 206 on the control channel to establish a communication channel with the base station 206 and also transmits the mobile station's GPS position (step 610). The base station 206 responds by transmitting a message through the control channel including information on the assigned time slots for transmitting and receiving messages from the base station 206.

The time or propagation delay is then computed by the control procedure 316 as the ratio of the GPS position of the base station 206 over the speed of light (step 614). The time delay 312 is then stored in the appropriate entry in the base station repository 308. The control procedure 316 then transmits a message from the mobile station 204 to the base station 206 before the start of the time slot by the time indicated by the time delay (step 616). The control procedure 316 repeats this step for each subsequent transmission (step 616).

Figure 7A:
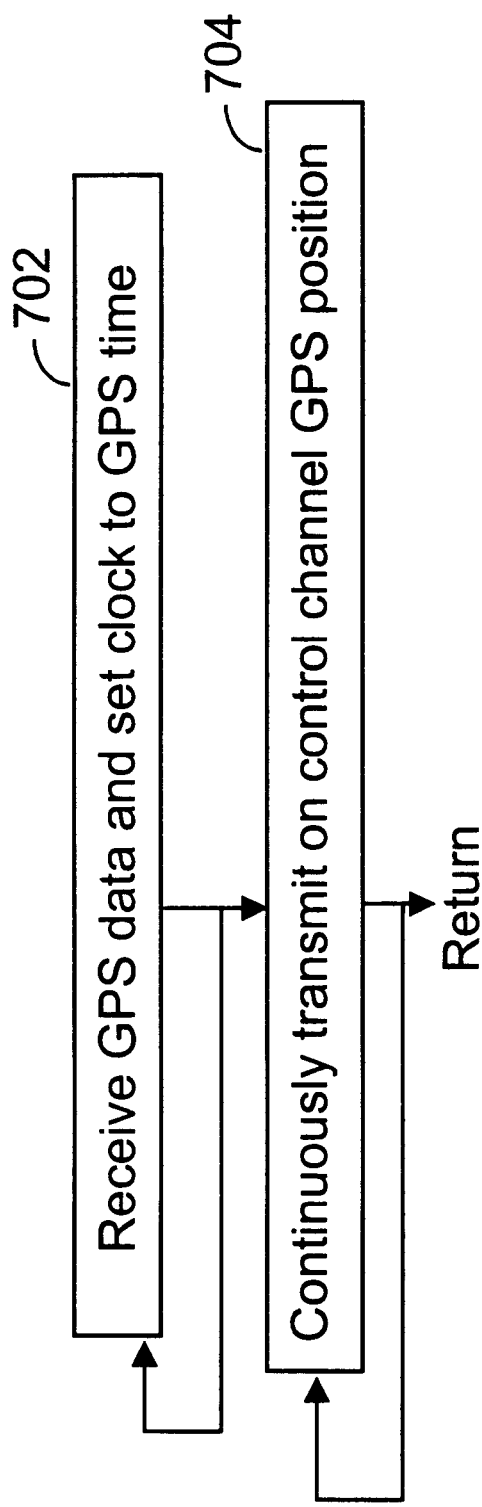
FIGS. 7A–7D illustrates the steps used by the base station in communicating with a mobile station.

FIG. 7A illustrates the steps performed by the control procedure 334 in the processing unit 213 of the base station 206 when the base station 206 receives signals from the GPS 202. The GPS receiver 208 receives at predefined time intervals signals from the GPS 202 (step 702). The GPS procedure 332 converts these signals into GPS data 306 representing the latitude, longitude, and elevation of the base station's current position as well as the GPS time (step 702). Initially, the processing unit 213 utilizes the GPS time to set the clock 210 (step 702). The base station 206 then continuously broadcasts on the control channel its GPS position (step 704). When the GPS position of the base station 206 significantly changes from the current GPS position, the new GPS position is broadcasted.

Figure 7B:
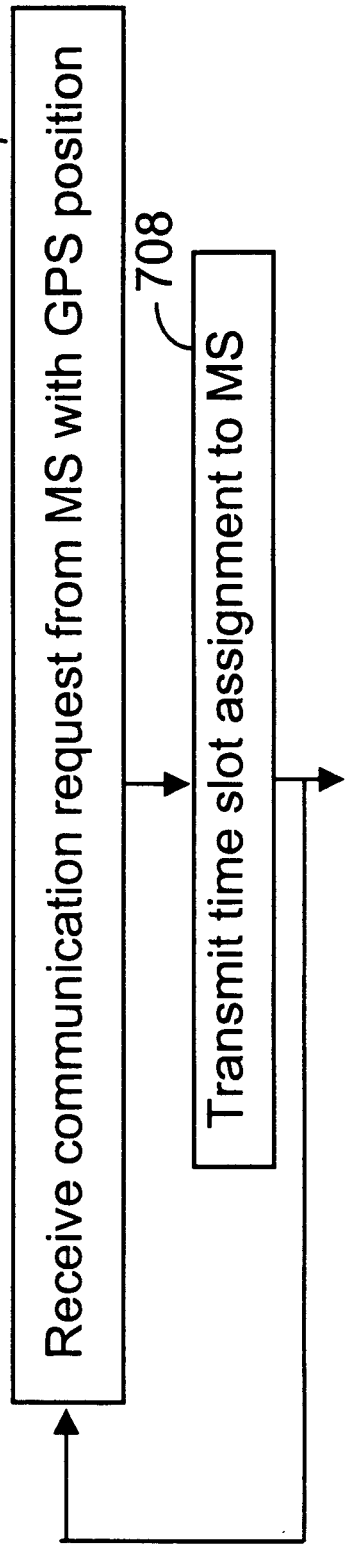

FIG. 7B illustrates the steps performed by the control procedure 334 in the processing unit 213 of the base station 206 in order to process communication requests from one or more mobile stations 204. The base station 206 receives a communication request from a mobile station 204 along with the mobile station's GPS position (step 706). The control procedure 334 assigns each mobile station 204 a time slot for receiving and transmitting data to the base station 206 and records in the mobile station repository 326 the mobile station's GPS position. The assigned time slot information is then transmitted back to the mobile station 204 through the control channel (step 708).

Figure 7C:
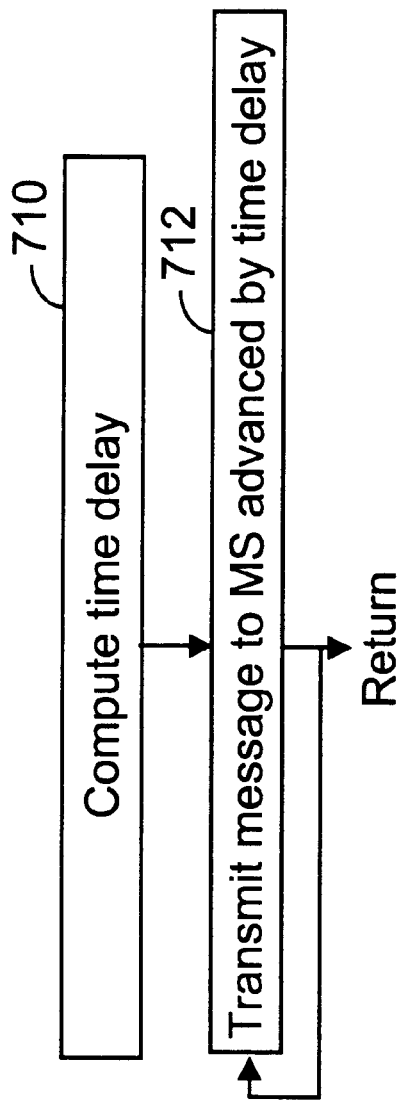

FIG. 7C illustrates the steps performed by the control procedure 334 in the processing unit 213 of the base station 206 when the base station 206 initially transmits a message to a mobile station 204. The control procedure 334 determines the time delay that the base station 206 uses to transmit a message to a mobile station 204 (step 710). The time delay 330 is computed as the distance between the mobile station's GPS position and the base station's GPS position over the speed of light (step 710). The time delay 330 is then stored in the mobile station repository 326. The control procedure 334 then generates the necessary signals to transmit the message to the mobile station 204 before the start of the designated time slot by an amount of time indicated by the time delay 330 (step 712). The base station 206 can repeat this step for each message that is transmitted to an intended mobile station 204 (step 712).

Figure 7D:
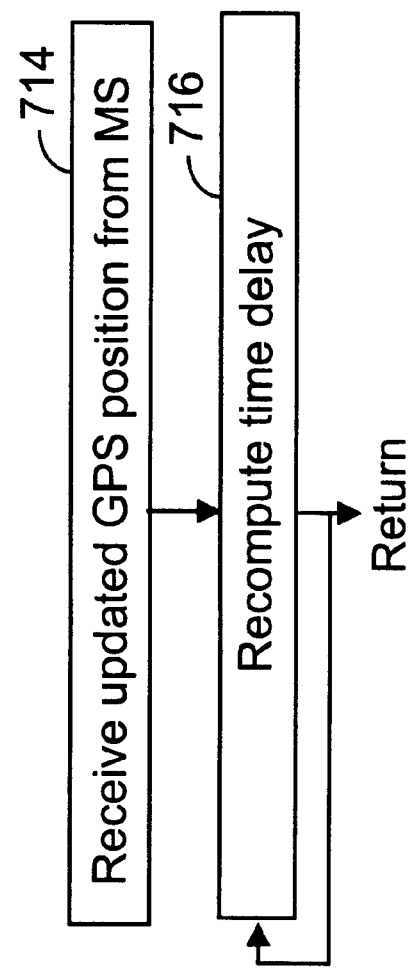

FIG. 7D illustrates the steps used by the control procedure 334 in the processing unit 213 of the base station 206 when the base station 206 receives a message from a mobile station 204 indicating its updated GPS position. The base station 206 receives the message and updates the appropriate entry in its mobile station repository 326 with the updated GPS position 328 (step 714). The control procedure 334 then recomputes the time delay 330 which can be stored in a corresponding entry in the mobile station repository 326 (step 716).

In an alternate embodiment, one of the stations can be situated at a fixed position thereby having a GPS position that remains stable. In this embodiment, the fixed station's GPS location can be determined initially and stored without having to constantly monitor the data received from the GPS receiver. The fixed station also transmits its position once to the non-stationary position. The non-stationary station records the fixed station's GPS position and does not have to monitor the channel for an updated position. Alternatively, the non-stationary can obtain the fixed station's GPS position from any source and is not constrained to receiving it from the fixed station.

In another alternate embodiment, one of the stations can be situated at a fixed position that can be determined by any type of positioning mechanism having an accurate measurement. Such an accurate measurement can be expressed in latitude and longitude coordinates or other type of measurement scheme. Once the fixed station's position is determined it is stored and need not be recomputed. The fixed station's position can then be transmitted to the non-stationary station without requiring the non-stationary station to constantly monitor the channel for position updates. Alternatively, the non-stationary station can determine the fixed station's position from other sources other than from a transmission generated by the fixed station.

The foregoing description, for purposes of explanation, used specific nomenclature to provide an understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

It should be noted that the present invention is not limited to a TDMA arrangement. Other multiple access schemes can be used such as but not limited to frequency division multiple access, code division, and the like.

Further, the method and system described hereinabove is amenable for execution on various types of executable mediums other than a memory device such as a random access memory. Other types of executable mediums can be used, such as but not limited to, a computer readable storage medium which can be any memory device, compact disc, or floppy disk.

I claim:

1. A wireless communication apparatus comprising:
   a first receiver that enables communication with a universal communication system, the universal communication system comprising a Global Positioning System (GPS);
   a transmitter/receiver that enables communication through a multiple channel access communication link to one or more communication units; and
   a processing unit that is assigned a time slot for transmitting data through the multiple channel access communication link to a select communication unit, that receives a position of the select communication unit that is based on a position signal emitted from the universal communication system, and that advances transmissions to the select communication unit by a time that is based on the position of the select communication unit.

2. The apparatus of claim 1,
   the processing unit further comprising a clock whose time is synchronized with a time signal emitted from the universal communication system.

3. The apparatus of claim 1,
   wherein the multiple channel access communication link is selected from the group consisting of a time division multiple access (TDMA) link, a frequency division multiple access link, and a code division multiple access link.

4. A method for providing wireless communication, the method comprising the steps of:
   acquiring a position signal from a receiving station, the position signal indicating a geographic location of the receiving station relative to a universal positioning system;
   obtaining a time slot within a multiple access communication channel for communicating with the receiving station;
   determining a time delay that indicates a propagation delay in transmitting to the receiving station, the time delay based on the position signal; and
   transmitting data to the receiving station prior to a start of the time slot by an amount of time indicated in the time delay.

5. The method of claim 4, comprising the steps of:
   acquiring a time signal from the universal positioning system; and
   synchronizing the transmissions of data by the transmitting step to the time signal.

6. A method for time slot synchronization in a multiple access communication network having a transmitting station and a receiving station, the method comprising the steps of:
   obtaining a Global Positioning System (GPS) position of the receiving station;
   acquiring a first time slot temporal position associated with a first communication channel;
   determining a first time delay representing a delay in transmission from the transmitting station to the receiving station, the first time delay based on the GPS position of the receiving station; and
   advancing transmission of data to the receiving station before the first time slot temporal position by an amount of time indicated by the first time delay so that the transmission coincides with a start of the first time slot temporal position.

7. The method of claim 6, obtaining a GPS position of the transmitting station;

acquiring a second time slot temporal position associated with a second communication channel;

determining a second time delay representing a delay in transmission from the receiving station to the transmitting station, the second time delay based on the GPS position of the transmitting station; and advancing transmission of data to the transmitting station before the second time slot temporal position by an amount of time indicated by the second time delay so that the transmission coincides with a start of the time slot temporal position.

8. The method of claim 6, acquiring in the transmitting station a first GPS time;

setting a clock in the transmitting station to the first GPS time;

acquiring in the receiving station a second GPS time; and setting a clock in the receiving station to the second GPS time.

9. The method of claim 7, the determining step further comprising the step of calculating the first time delay as the ratio of a difference between the GPS position of the base station and the GPS position of the mobile station over a speed of light.

10. The method of claim 7, the determining step further comprising the step of calculating the second time delay as the ratio of a difference between the GPS position of the mobile station and the GPS position of the mobile station over a speed of light.

11. A wireless communication system, said system comprising:

a satellite communication system that emits one or more position signals;

a multiple access radio communication link that enables communication between a mobile station and a base station;

a base station, including:
  a first receiver that receives a first one of the position signals;
  a first transmitter/receiver that enables communication through the multiplex access radio communication link; and
  a first processing unit that receives the first position signal and determines a geographic location of the base station based on the first position signal, that transmits the geographic location to a mobile station, and that assigns time slots for application on the multiplex access radio communication link; and at least one mobile station, including:
  a second transmitter/receiver that enables communication through the multiplex access radio communication link; and
  a second processing unit that receives a first time slot for communication with the base station, that receives the geographic location of the base station, and that advances transmissions to the base station before the first assigned time slot by a time delay that is based on the geographic location of the base station so that the transmission coincides with a start of the first time slot.

12. The system of claim 11, the mobile station comprises a second receiver that receives a second one of the position signals;

wherein the second processing unit receives the second position signal, determines a geographic location of the mobile station and transmits the geographic location of the mobile station to the base station;

wherein the first processing unit advances a transmission to the mobile station before a second time slot by a second time delay that is based on the geographic location of the mobile station so that the transmission coincides with a start of the second time slot.

13. The system of claim 11, wherein the satellite communication system emits one or more time signals;

wherein the first receiver receives a first one of the time signals;

the first processing unit including a first clock that is set to the first time signal and used to time transmissions to the mobile station;

wherein the second receiver receives a second one of the time signals; and the second processing unit including a second clock that is set to the second time signal and used to time transmissions to the base station.

14. A computer readable memory to direct a wireless communication apparatus to function in a specified manner, comprising:

a first executable module including instructions to receive one or more signals from a Global Positioning System (GPS) and to generate a GPS position; and a second executable module including instructions to receive a GPS position associated with a first communication apparatus, to obtain a time slot associated with a multiple access communication channel that enables communication with the first communication apparatus, to determine a time delay based on the GPS position associated with the first communication apparatus and to advance transmissions to the first communication apparatus by the time delay prior to a start of the time slot so that the transmission coincides with a start of the time slot.

15. The apparatus of claim 14, further comprising:

the first executable module including instructions to generate a GPS time and to set a clock associated with the apparatus to the GPS time.

16. A wireless communication apparatus, comprising:

a memory for storing a position associated with the apparatus, the position derived from a latitudal and longitudal coordinate measurement;

a transmitter/receiver that enables communication through a multiple channel access communication link to one or more of the communication units;

a processing unit that is assigned a time slot for transmitting data through the multiple channel access communication link from a select communication unit, the processing unit advancing a transmission to the select communication unit by a time that is based on the position of the apparatus so that the transmission arrives at the start of the assigned time slot.

17. The apparatus of claim 16, comprising:

the memory including a position associated with the select communication unit;

wherein the processing unit advances the transmission to the select communication unit by a time that is based on the position of the apparatus and the position of the select communication unit so that the transmission arrives at the start of the assigned time slot.

18. The apparatus of claim 16, wherein the positions are obtained from a global positioning system.

19. The apparatus of claim 16, the processing unit further comprising a clock whose time is synchronized with a time associated with the select communications unit in order for the processing unit to transmit the transmissions so that they arrive at the start of the time slot.

* * * * *